(12) United States Patent
Colavincenzo et al.

(10) Patent No.: US 11,548,614 B2
(45) Date of Patent: Jan. 10, 2023

(54) NOISE ATTENUATING DEVICE TO REDUCE NOISE GENERATED BY AN OPENING IN A SKIN OF AN AIRCRAFT

(71) Applicant: BOMBARDIER INC., Dorval (CA)

(72) Inventors: Stephen Colavincenzo, Toronto (CA); Mark Huising, Toronto (CA); Stephane Brunet, Pierrefonds (CA)

(73) Assignee: BOMBARDIER INC., Dorval (CA)

( * ) Notice: Subject to any disclaimer, the term of this patent is extended or adjusted under 35 U.S.C. 154(b) by 278 days.

(21) Appl. No.: 16/772,295

(22) PCT Filed: Dec. 11, 2018

(86) PCT No.: PCT/CA2018/051578
§ 371 (c)(1),
(2) Date: Jun. 12, 2020

(87) PCT Pub. No.: WO2019/113689
PCT Pub. Date: Jun. 20, 2019

(65) Prior Publication Data
US 2021/0070418 A1    Mar. 11, 2021

Related U.S. Application Data

(60) Provisional application No. 62/599,428, filed on Dec. 15, 2017.

(51) Int. Cl.
*B64C 1/40* (2006.01)
*B64C 7/00* (2006.01)
*G10K 11/172* (2006.01)

(52) U.S. Cl.
CPC ........... *B64C 1/403* (2013.01); *B64C 7/00* (2013.01); *G10K 11/172* (2013.01)

(58) Field of Classification Search
USPC .............................. 181/175; 381/71.2, 71.14
See application file for complete search history.

(56) References Cited

U.S. PATENT DOCUMENTS

| | | | |
|---|---|---|---|
| 3,392,225 | A | 7/1968 | Phelan |
| 4,240,250 | A | 12/1980 | Harris |

(Continued)

FOREIGN PATENT DOCUMENTS

| | | | |
|---|---|---|---|
| EP | 2752363 A1 | 7/2014 | |
| GB | 671752 A | 5/1952 | |
| GB | 708693 A | 5/1954 | |

OTHER PUBLICATIONS

International Searching Authority, International Search Report and Written Opinion re. International Application No. PCT/CA2018/051578, dated Feb. 20, 2019.

(Continued)

*Primary Examiner* — Alexander Krzystan
(74) *Attorney, Agent, or Firm* — Norton Rose Fulbright Canada LLP

(57) ABSTRACT

A noise attenuating device for reducing acoustic resonance in a cavity of an aircraft with an opening in a skin of the aircraft defining a first surface area and an opening peripheral edge includes a connection mechanism for securing the noise attenuating device in proximity to the opening in the skin of the aircraft and an exterior surface. The exterior surface defines a second surface area that is less than the first surface area of the opening and a device peripheral edge, which has a first section having an edge profile complimentary to at least a portion of the opening peripheral edge and a second section having an indented edge profile in relation to the first section such that when the noise attenuating device is secured within the opening, at least one gap is formed between the device peripheral edge and the opening peripheral edge.

24 Claims, 11 Drawing Sheets

(56) References Cited

U.S. PATENT DOCUMENTS

| | | | |
|---|---|---|---|
| 4,909,346 | A | 3/1990 | Torkelson |
| 9,487,289 | B2 | 11/2016 | Patience |
| 10,416,009 | B1* | 9/2019 | Miller .................. G01F 15/185 |
| 2001/0032907 | A1 | 10/2001 | Borchers et al. |
| 2006/0163425 | A1 | 7/2006 | Brown et al. |
| 2008/0078457 | A1* | 4/2008 | Sandiford ............... F16K 17/02 |
| | | | 137/511 |
| 2008/0149772 | A1 | 6/2008 | Sandiford et al. |
| 2008/0295905 | A1* | 12/2008 | Sandiford ............... F16K 17/16 |
| | | | 29/428 |
| 2010/0047665 | A1* | 2/2010 | Takeshita ................ B60L 58/30 |
| | | | 429/515 |
| 2011/0136425 | A1 | 6/2011 | Eichholz et al. |
| 2012/0227389 | A1* | 9/2012 | Hinderks .................. F01L 3/02 |
| | | | 60/317 |
| 2016/0091112 | A1 | 3/2016 | Gibbs |
| 2021/0070418 | A1* | 3/2021 | Colavincenzo ........... B64C 7/00 |

OTHER PUBLICATIONS

English translation of European patent document No. EP 2752363 dated Jul. 9, 2014, https://patents.google.com/patent/EP2752363A1/en?oq=EP+2752363, accessed on Jun. 11, 2020.

Maria Chiorando, Tunbridge Wells MP Greg Clark wins campagn against British Airways engine noise, Kent News, Jun. 2015, Archant Community Media Ltd.

* cited by examiner

NOISE ATTENUATING DEVICE TO REDUCE NOISE GENERATED BY AN OPENING IN A SKIN OF AN AIRCRAFT

CROSS-REFERENCE TO RELATED APPLICATION(S)

This application is a national phase application under 35 U.S.C. 371 of International Patent Application No. PCT/CA2018/051578 filed on Dec. 11, 2018, which claims priority from U.S. Provisional Patent Application Ser. No. 62/599,428 filed on Dec. 15, 2017, the entire content of which is incorporated herein by reference.

FIELD OF THE INVENTION

The present invention concerns a noise attenuating device for reducing acoustic resonance occurring in an opening in a skin of an aircraft. More specifically, the present invention concerns a noise attenuating device for an aircraft used in connection with a skin opening to a fuel tank overpressure relief valve.

DESCRIPTION OF THE BACKGROUND AND RELATED ART

As should be apparent to those skilled in the art, there are a number of reasons for an aircraft to include an opening in its skin. One of these reasons includes the need to access one or more relief valves from the exterior of the aircraft.

Relief valves are provided in many different devices to protect one or more components from damage should pressure in a fluid system exceed a predetermined value. In some instances, the predetermined value may be a maximum pressure for safe operation of a component and/or system.

Aircraft often include fuel tanks that are incorporated into the wings of the aircraft. During fueling, it is possible, albeit unlikely, that the aircraft may be over-fueled. If so, it is possible that the pressure of the fuel may exceed a design tolerance. Since the fuel tanks are incorporated into the wings of the aircraft, excessive pressure on the interior of the wings might negatively impact the fuel tank and/or the wing.

To avoid an overpressure condition in the fuel tanks, aircraft are provided with fuel tank overpressure relief valves that open when the pressure in the fuel tanks exceeds a predetermined value. Excess fuel is discharged through the relief valve until the overpressure condition abates.

As a safety device, a relief valve is not expected to operate very frequently, if ever. However, as should be apparent to those skilled in the art, when valves are not operated regularly, they can "stick" when actuated. This may result in a condition where more than the design pressure is needed to actuate the relief valve, especially after a long period of non-use.

So that the fuel tank overpressure relief valves on an aircraft operate as designed, the maintenance schedules for aircraft include steps for manually opening and closing the fuel tank overpressure relief valves.

As should be apparent to those skilled in the art, the outlet openings from the fuel tank overpressure relief valves are located on the underside of the wings of the aircraft.

It is known that these outlet openings (and the conduits that lead to them) can generate noise during operation of the aircraft. Specifically, when air flows over the outlet opening, an acoustic tone may be generated as a result of acoustic resonance inside the outlet opening and attached conduit.

Noise is a concern for aircraft manufacturers that seek to design aircraft with quiet operations.

While some solutions have been proposed by the prior art to abate the noise generated by these outlet openings, a need exists for improved solutions.

SUMMARY OF THE INVENTION

The present invention addresses one or more of the deficiencies with respect to the prior art.

In particular, the present invention provides a noise attenuating device for reducing excitation of acoustic resonance in a cavity of an aircraft. The cavity has an opening in a skin of the aircraft. The opening defines a first surface area and an opening peripheral edge. The noise attenuating device includes a connection mechanism for securing the noise attenuating device in proximity to the opening in the skin of the aircraft. It also defines an exterior surface. The exterior surface defines a second surface area that is less than the first surface area of the opening and a device peripheral edge. The device peripheral edge includes a first section having an edge profile complimentary to at least a portion of the opening peripheral edge and a second section having an indented edge profile in relation to the first section such that when the noise attenuating device is secured within the opening, at least one gap is formed between the device peripheral edge and the opening peripheral edge.

In one or more embodiments, the first section may have a convex arcuate edge profile.

In other embodiments, the second section may have a concave arcuate edge profile.

Still further, the indented edge profile may define a finger-hold for grasping the exterior surface.

In another contemplated embodiment, the indented edge profile defines two finger-holds for grasping the exterior surface.

The noise attenuating device also may include a handle extending from the exterior surface.

It is contemplated that the exterior surface conforms to a shape of the skin of the aircraft.

It is also contemplated that the exterior surface may define a cross-shape, the first section of the device peripheral edge being end surfaces of each arm of the cross-shape. Here, two of the four vanes of the cross-shape may be aligned with an air flow across the opening. Still further, two of the four vanes of the cross-shape may be disposed at substantially 45° with an air flow across the opening.

For the noise attenuating device, the cavity may lead to a fuel overpressure relief valve and a stem may extend between the fuel overpressure relief valve and the opening. It is contemplated that the connection mechanism connects the noise attenuating device to the stem.

The connection mechanism may include one of a threaded shaft and a threaded hole.

The connection mechanism may include an integrally formed connection between the stem and the noise attenuating device.

A ratio of the second surface area to the first surface area may be greater than or equal to 0.8, 0.85, 0.9, or 0.95.

Where the exterior surface defines a cross-shape, the ratio of the second surface area to the first surface area may be less than or equal to 0.2, 0.15, 0.1, or 0.05.

The skin of the aircraft may be a wing skin and the connection mechanism may secure the exterior surface of the noise attenuating device a predetermined offset distance h from the wing skin.

It is contemplated that the exterior surface is contiguous with the wing surface such that h=0.

The exterior surface may be interior to the wing surface such that h<0.

The exterior surface may be exterior to the wing surface such that h>0.

The present invention also provides an actuator for a fuel tank overpressure relief valve of an aircraft. The fuel tank overpressure relief valve is positioned at a first end of a cavity in the aircraft. An opening in a skin of the aircraft is positioned at a second end of the cavity. The opening defines a first surface area and an opening peripheral edge. The actuator includes a stem with a first end connected to the fuel tank overpressure relief valve and a second end in proximity to the opening in the skin of the aircraft. The actuator also includes an exterior surface located at the second end of the stem. The exterior surface defines a second surface area that is less than the first surface area of the opening. The exterior surface defines a device peripheral edge with at least one first section having an edge profile complimentary to at least a portion of the opening peripheral edge and at least one second section having an edge profile indented in relation to the at least one first section such that when the noise attenuating device is secured within the opening, at least one gap being formed between the device peripheral edge and the opening peripheral edge.

In addition, the present invention provides a wing of an aircraft. The wing includes a fuel tank overpressure relief valve and a cavity extending from the fuel tank overpressure relief valve to an opening in a skin of the wing. The opening defines a first surface area and a noise attenuating device positioned within the opening in the skin of the aircraft. The noise attenuating device has an exterior surface defining a second surface area that is less than the first surface area of the opening for disrupting air flow across the opening when the aircraft is in flight.

The noise attenuating device may be positioned at an end of a stem for actuating the fuel tank overpressure relief valve.

Further aspects of the present invention will be made apparent from the paragraphs that follow.

BRIEF DESCRIPTION OF THE DRAWING(S)

The present invention will now be described in connection with the drawings appended hereto, in which.

DETAILED DESCRIPTION OF EMBODIMENT(S) OF THE INVENTION

The present invention relates to a noise attenuating device for reducing acoustic resonance occurring in an opening in a skin of an aircraft. In a specific embodiment, the present invention concerns a noise attenuating device for an aircraft used in connection with an opening in the skin of an aircraft leading to a fuel tank overpressure relief valve.

The present invention will now be described in connection with one or more embodiments. The discussion of any one particular embodiment is not intended to be limiting of the present invention. To the contrary, any discussion of specific embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

Figure 1:
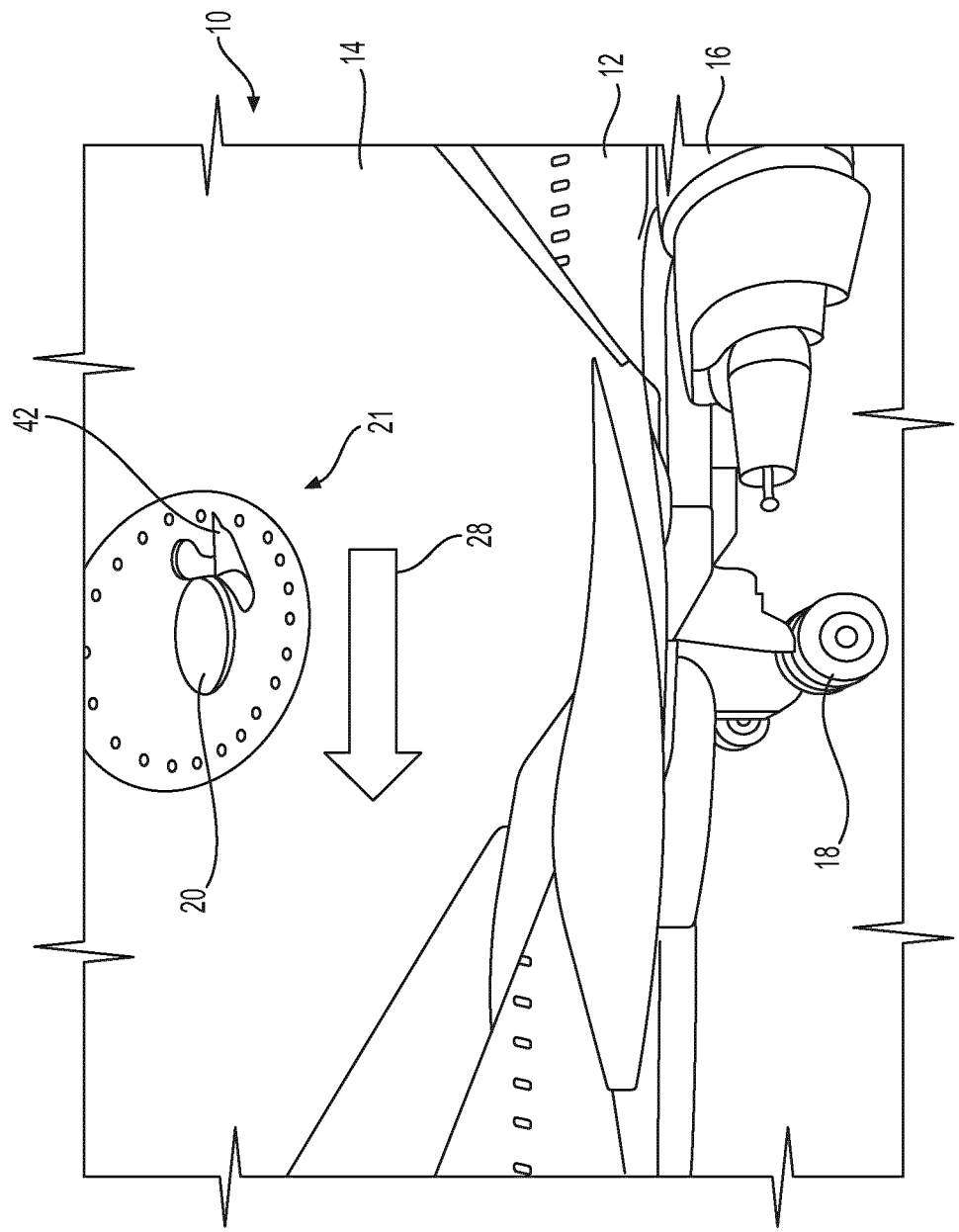
FIG. 1 is a perspective illustration of the underside of a wing of an aircraft, illustrating one location of an opening permitting fuel to be discharged from the wing during a fuel tank overpressure condition, the illustration also showing one conventional vortex generator used to reduce noise generated by the opening.

FIG. 1 is a perspective illustration of a portion of an aircraft 10 and is generally described to illustrate some components for reference purposes in the present disclosure. The aircraft 10 includes a fuselage 12 and a wing 14. For reference, the figure also shows an engine 16 connected to the wing 14 and landing gear 18 connected to the fuselage 12.

In the discussion that follows, reference is made to a single wing 14 of the aircraft 10. However, both wings 14 on the aircraft 10 are contemplated to be mirror images of one another. Therefore, both wings 14 are contemplated to have the same structure. Accordingly, the discussion of one of the wings 14 is contemplated to apply equally to the other wing 14 on the aircraft 10.

As illustrated in FIG. 1, the underside of the wing 14 includes an opening 20 in the skin 21 of the aircraft 10. The opening 20 is an outlet from a cavity, such as a conduit 22 illustrated in FIG. 2 or a conduit 24 illustrated in FIG. 3.

Figure 2:
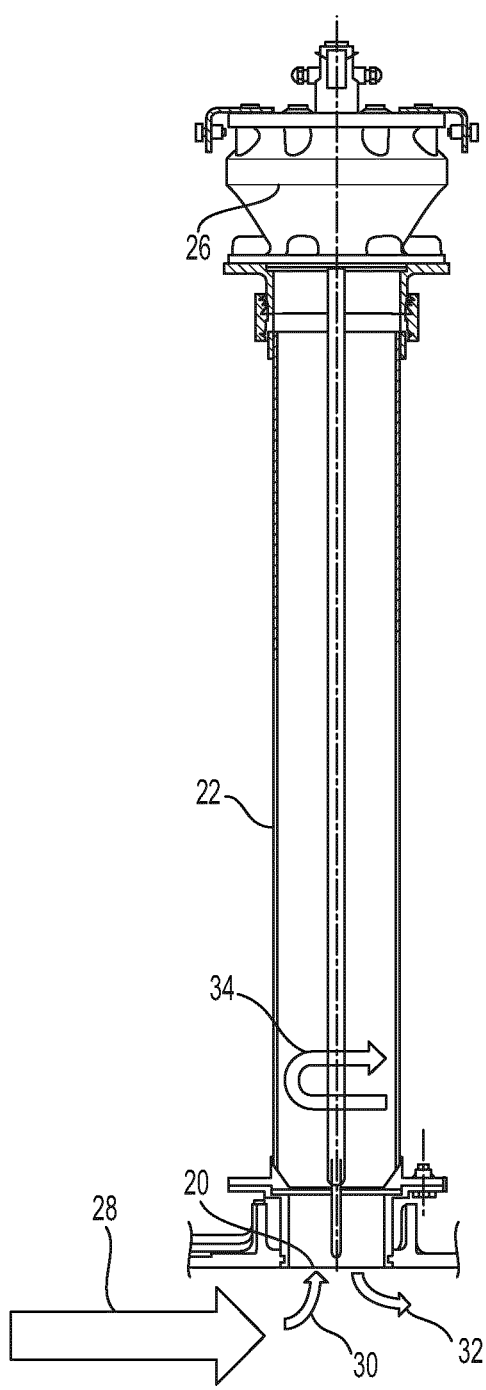
FIG. 2 is a side view, graphical illustration of a long pipe conduit for dumping fuel from an aircraft fuel tank during a fuel tank overpressure condition.
Figure 3:
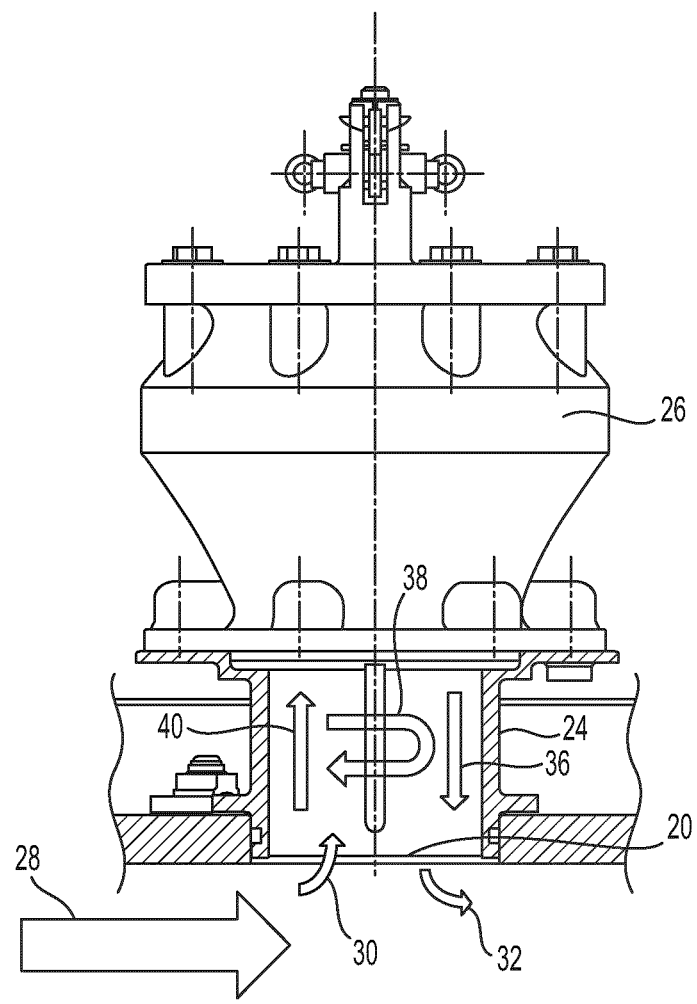
FIG. 3 is a side view, graphical illustration of a short pipe conduit for dumping fuel from an aircraft fuel tank during a fuel tank overpressure condition.

In the non-limiting embodiments shown in FIGS. 2 and 3, the conduits 22, 24 connect to a fuel tank overpressure relief valve 26 in the wing 14 of the aircraft 10. The fuel tank overpressure relief valve 26 is provided on the fuel tank (not shown) in the wing 14 of the aircraft 10 to avoid the pressure in the fuel tank from exceeding a predetermined threshold value. It is contemplated that the pressure in the fuel tank might exceed a design pressure if, for example, the fuel tank is over-filled.

Since the fuel tank is inside of the wing 14, if the pressure in the fuel tank becomes too high, it is possible that the fuel tank and/or the wing 14 might be negatively affected by the excessive pressure. To avoid the fuel pressure from placing too great a pressure on the fuel tank and/or the interior of the wing 14, the fuel tank overpressure relief valve 26 is designed to open, permitting fuel to be purged from the fuel tank, through the conduit 22, 24.

FIG. 2 illustrates a conduit 22 that is referred to as a "long pipe" variant due to its long length. FIG. 3 illustrates a conduit 24 that is referred to as a "short pipe" variant due to its short length. It is noted that the length of the conduit 22, 24 is not particularly relevant to the present invention. The present invention may be incorporated into aircraft 10 with cavities or conduits 22, 24 of any length.

While the present invention will be described in the context of an opening 20 to conduits 22, 24 of a fuel tank overpressure relief valve 26, it is understood that the noise attenuation device of the present invention is applicable to any opening in a skin 21 of an aircraft that leads to a cavity or conduit 22, 24. The opening 20 may be at any location on the aircraft 10 and is not limited to the wings 14.

Still referring to FIGS. 2 and 3, it is to be understood that, regardless of the length of the conduit 22, 24, it is possible that the opening 20 and the conduits 22, 24 may generate noise when the aircraft 10 is in flight. As illustrated both in FIG. 2 and in FIG. 3, air flows over the skin 21 (in particular, the underside of the wing 14) in an air flow direction 28 when the aircraft 10 is in flight. The air flow 28 is contemplated to interact with the opening 20, as indicated by the arrows 30, 32. Within the conduit 22, 24, the air flow may persist in any of a number of ways. Regardless of how the air flow 28 interacts with the opening 20 and the conduit 22, 24, it is possible that it may create an excitation of an acoustic mode (resonance) in the conduit 22, 24, which can create significant noise.

With renewed reference to FIG. 1, one conventional approach to the problem of the noise generated by the conduit 22, 24 is shown. Specifically, to reduce noise, it is known that, by adding a turbulator 42 (also known as a vortex generator) to the leading edge of an opening 20, on the skin 21 of the aircraft 10, it is possible to reduce the generation of noise by that opening 20. In this example, the turbulator 42 creates a region of air flow turbulence immediately behind the turbulator 42. As a result, the turbulator 42 disturbs the air flow 28 across the skin 21 of the aircraft 10 and, thereby, reduces the incidence of noise generated by the opening 20 and the associated conduit 22, 24 or cavity.

However, the turbulator 42 operates by creating a localized turbulent air flow, which is undesirable. Localized turbulent air flow increases the drag on the aircraft as a whole. Accordingly, while the turbulator 42 has the potential for reducing noise, it also reduces the overall performance of the aircraft. At least for this reason, turbulators 42 are generally disfavored.

Broadly, the present invention seeks to provide a noise attenuation device that reduces the excitation of acoustic resonance in a cavity or conduit 22, 24 of an aircraft 10, where the cavity or conduit 22, 24 has an opening 20 in the skin 21 of the aircraft 10. The cavity may be a conduit 22, 24 or any other volume within the aircraft 10 that might generate noise when the aircraft 10 is operating.

Shown in FIGS. 4-11 are various noise attenuating devices 50, 76, 82, 100 according to the present invention. Before discussing each specific embodiment of the noise attenuating devices 50, 76, 82, 100, an overall approach that is incorporated into each of the embodiments will be described broadly with respect to the noise attenuating device 50 of FIG. 4.

Figure 4:
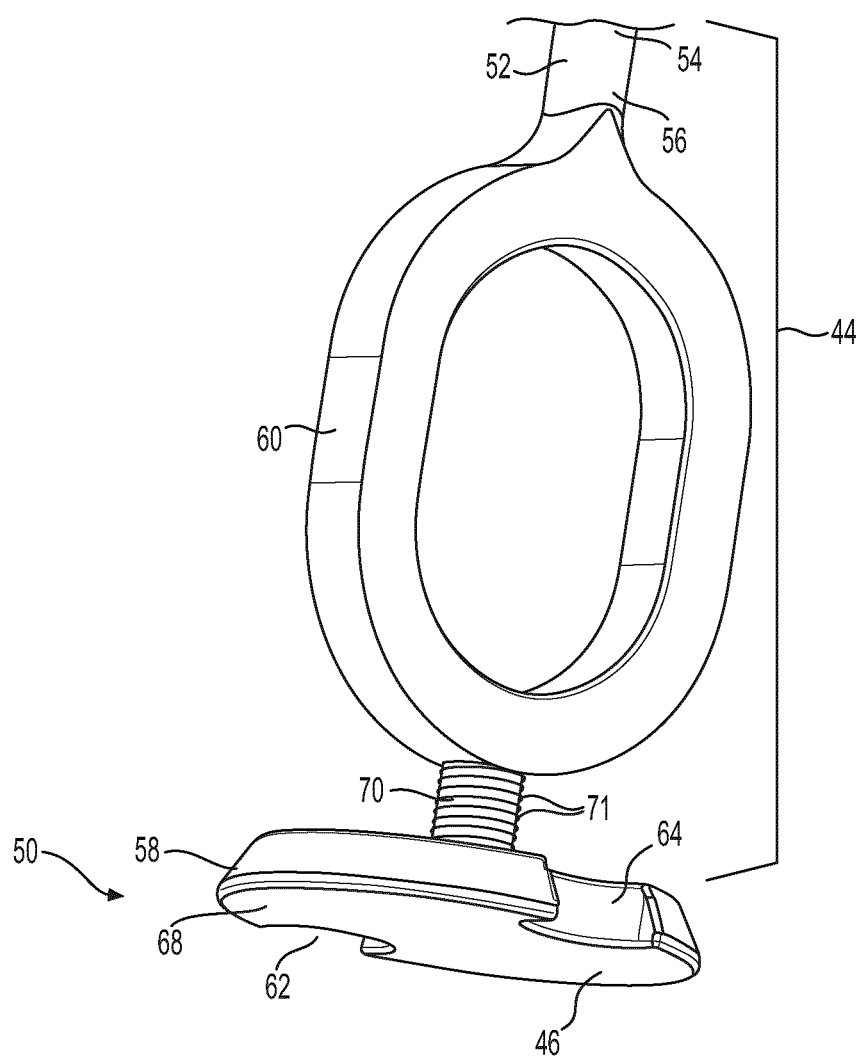
FIG. 4 is a perspective, graphical illustration of a first embodiment of a noise attenuating device to reduce noise generated by an opening in a skin of an aircraft.

As shown in FIG. 4, the noise attenuating device 50 is contemplated to be provided in an opening 20 in the skin 21 of an aircraft 10 to prevent airflow over the opening 20 from exciting the acoustic mode thereby preventing or reducing the sound/noise generated. Since it is contemplated that the noise attenuating device 50 may be used in connection with a valve, such as the fuel tank overpressure relief valve 26, it is contemplated that the noise attenuating device 50 may be part of, combined with, and/or connected to an actuator 44 of that fuel tank overpressure relief valve 26.

In the non-limiting embodiment illustrated in FIG. 4, the actuator 44 includes additional, non-limiting components, such as a stem 52, a connection mechanism 70, and a handle 60. The actuator 44 connects to the fuel tank overpressure relief valve 26 so that it may be manipulated by a user to manually cycle the fuel tank overpressure relief valve 26. Manual cycling of the fuel tank overpressure relief valve 26 is required during the maintenance cycle of the aircraft 10 to assure that the fuel tank overpressure relief valve 26 does not fail to operate when conditions require its operation.

Alternatively, the noise attenuating device 50 may be separate from the actuator 44 and secured in proximity to the opening 20 in the skin 21 of the aircraft 10 in another way.

Still further, the actuator 44 may exclude the handle 60 without departing from the scope of the present invention. In its most minimal configuration, the actuator 44 may comprise only the stem 52, such that the stem 52 connects directly to the noise attenuation device 50.

Referring back to FIG. 4, the noise attenuating device 50 is connected to a connection mechanism 70 that secures the noise attenuating device 50 in proximity to the opening 20 in the skin 21 of the aircraft 10. As noted, in the non-limiting embodiment shown, this connection mechanism 70 secures the noise attenuating device 50 to a handle 60 and a stem 52 of the actuator 44. The connection mechanism 70 shown in FIG. 4 comprises a threaded shaft that connects the noise attenuating device 50 to the handle 60, which connects to the stem 52. However, as noted, other connection mechanisms, including an integrally formed connection between the stem 52 and the noise attenuating device 50, are included within the scope of the present invention.

Figure 5:
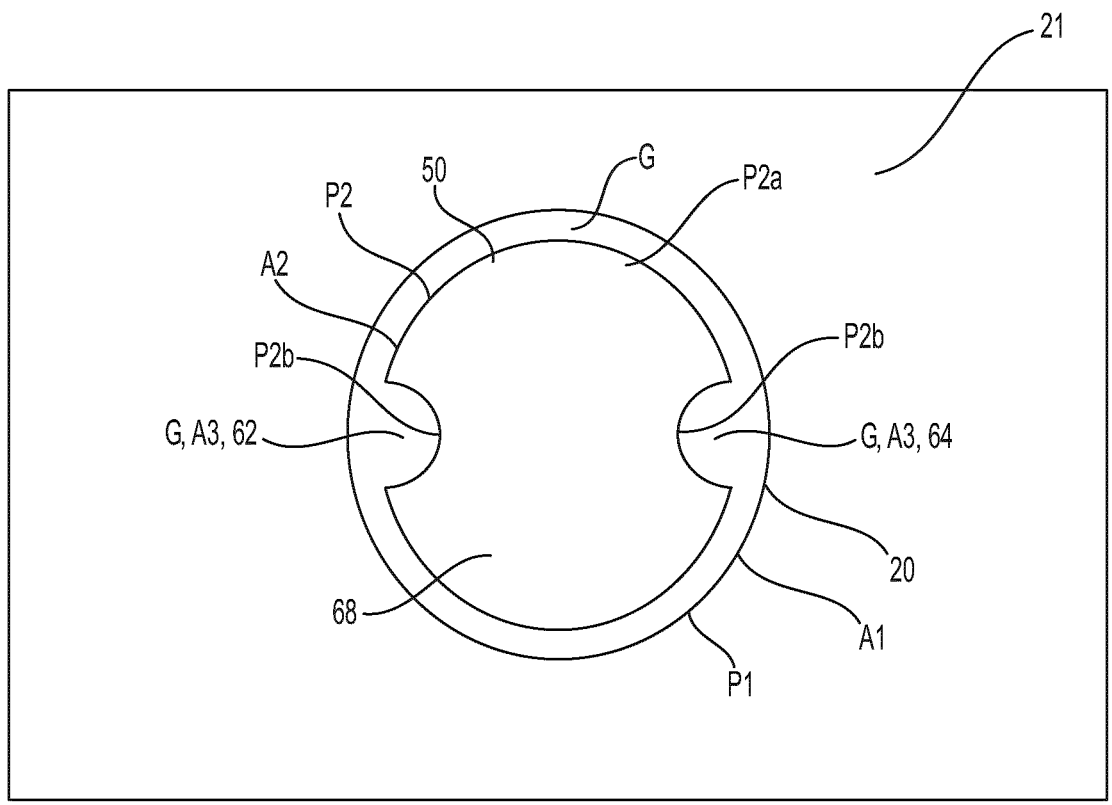
FIG. 5 is a bottom plan view illustration of the first embodiment of the noise attenuating device illustrated in FIG. 4.

The noise attenuating device 50 cooperates with the opening 20. As shown in FIG. 5, the opening 20 defines a first surface area A1 and an opening peripheral edge P1. The noise attenuating device 50 comprises an exterior surface 68 defining a second surface area A2 that is less than the first surface area A1 defined by the opening 20. As should be apparent, the exterior surface 68 is contemplated to define a device peripheral edge P2. The device peripheral edge P2 comprises two features. First, the device peripheral edge P2 comprises a first section P2a with an edge profile that is complimentary to at least a portion of the opening peripheral edge P1. In the embodiment shown in FIG. 5, the peripheral edge of the first section P2a comprises a convex arcuate surface so as to be complementary to the circular peripheral edge P1 of the circular opening 20. Second, the device peripheral edge P2 comprises a second section P2b with an indented edge profile in relation to the first section P2a. In the embodiment shown in FIG. 5, the peripheral edge of the second section P2b comprises a concave arcuate edge profile indented in relation to the first section P2a. When the noise attenuating device 50 is secured within the opening 20, the second section P2b forms at least one gap G between the device peripheral edge P2 and the opening peripheral edge P1. In the contemplated construction, the noise attenuating device 50 and the opening 20 will fit snugly along the first section P2a.

As will be made apparent from the discussion of specific embodiments, described below, the gap(s) G may establish finger-hold(s) 62, 64, that permit a user, such as a technician, to insert a finger into the gap(s) G to manipulate the noise attenuating device 50. In the case where the exterior surface 68 is connected to a valve, such as the fuel tank overpressure relief valve 26, the exterior surface 68 may be manipulated to actuate the valve.

As discussed above, the present invention seeks to provide a device that reduces and/or eliminates noise generation by an opening 20 in the skin 21 of the aircraft 10. The present invention also seeks to accomplish this objective while also having a minimal, if not non-existent, impact on the drag associated with the aircraft 10.

As noted above, in the embodiment of FIG. 4, the noise attenuating device 50 is connected to a stem 52 that has a first end 54 and a second end 56. The stem 52 is disposable within a conduit 22, 24, as discussed above. The first end 54 of the stem 52 is contemplated to be connected to the fuel tank overpressure relief valve 26. The second end 56 connects to the noise attenuation device 50. In addition, in the illustrated embodiment, the second end 56 also includes a handle 60 that is connected to the noise attenuation device 50. As should be apparent, for this embodiment, the stem 52 and handle 60 are part of actuator 44 that secures the noise attenuating device 50 in proximity to the opening 20 in the skin 21 of the aircraft 10.

In this first embodiment, the noise attenuating device 50 is configured to be accessible through the opening 20. Specifically, using finger holds 62, 64, the noise attenuation device 50 may be grasped by a user so that the user may manually actuate or cycle the fuel tank overpressure relief valve 26 by pulling on the noise attenuation device 50.

In the illustrated embodiment, the connection mechanism 70 is illustrated as a threaded shaft. The connection mechanism 70 may be threaded to engage complimentary threads in a hole in the bottom of the handle 60, so as to attach the noise attenuation device 50 to the shaft 52. It is noted that threads 71 are not required for the present invention but are included as one possible variant. Alternatively, the connection mechanism 70 may comprise a threaded hole in the noise attenuating device 50 and the threaded shaft may be part of the shaft 52.

As should be apparent, the noise attenuation device 50 is contemplated to be disposed in the opening 20. As a result of this positioning, the exterior surface 68 attenuates noise, because it covers most of the opening 20. In the non-limiting embodiment shown, the exterior surface 68 is connected, via the connection mechanism 70, the handle 60, and the stem 52, to the fuel tank overpressure relief valve 26. As a result, when the fuel tank overpressure relief valve 26 opens, the noise attenuation device 50 extends out of the opening 20 through downward motion of the stem 52. This permits the fuel to be dumped from the fuel tank through the conduit 22, 24.

It is noted that the finger holds 62, 64 serve at least two functions. First, the finger holds 62, 64 permit a user to grasp the noise attenuation device 50 using his or her fingers. Second, the finger holds 62, 64 also provide a safety feature for the noise attenuating device 50. Specifically, if the noise attenuation device 50 were to become lodged in the opening 20 during a fuel tank overpressure incident, the finger holds 62, 64 provide an avenue for the discharge of fuel from the fuel tank. In a non-limiting embodiment, the finger holds 62, 64 are sized to allow for the fuel to properly vacate the conduit 22, 24 should the fuel tank overpressure valve open while the noise attenuation device 50 is positioned within the opening 20.

In the illustrated embodiment of the noise attenuating device 50, two finger holds 62, 64 are provided. It is contemplated that the noise attenuating device 50 may include only one finger hold 62. However, since it is contemplated that the noise attenuation device 50 will be grasped by the user's thumb and forefinger, two finger holds 62, 64 are provided. In alternative embodiments, it is possible that a larger number of finger holds 62, 64 may be provided on the noise attenuation device 50.

In still another variation, the finger holds 62, 64 may be provided as finger holes that are interior to the peripheral edge 70 of the exterior surface 68. In other words, the finger holds 62, 64 need not be styled as indentations in the device peripheral edge P2 of the exterior surface 68. Instead, the finger holds 62, 64 may be styled as holes, much like the finger holes found on a bowling ball.

As shown in FIG. 4, the finger holds 62, 64 establish two gaps G between the noise attenuation device 50 and the opening peripheral edge P1, so that a person may insert his or her thumb and forefinger therein. As a result, the finger holds 62, 64 are positioned at opposite sides of the exterior surface 68. As should be apparent, however, the finger holds 62, 64 need not be positioned at opposite sides of the exterior surface 68 to practice the present invention. Other configurations, therefore, are considered to fall within the scope of the present invention.

With continued reference to the noise attenuating device 50, it is noted that the finger holds 62, 64 establish a finger hold area A3. As described above, the opening 20 in the aircraft skin defines a first surface area A1 and the noise attenuating device 50 comprises an exterior surface 68 defining a second surface area A2. Naturally, given that the noise attenuating device 50 includes an indented edge profile to form the finger hold area A3, the second surface area A2 of the noise attenuating device 50 is less than the first surface area A1 of the opening 20.

As illustrated in FIGS. 4-5, the exterior surface 68 defines a second surface area A2 that is smaller than the first surface area A1 at least because of the inclusion of the finger holds 62, 64 that define the finger hold area A3. Specifically, a ratio of the second surface area A2 to the first surface area A1 is contemplated to be greater than or equal to 0.8. In another embodiment, the ratio may be greater than or equal to 0.85. Still further, the ratio is contemplated to be greater than or equal to 0.9. In yet another configuration, the ratio may be greater than or equal to 0.95. As should be apparent, the magnitude of this ratio may depend on a number of variables including, but not limited to, the size of the second surface A2, the size of the first surface area A1, and the sizes of the finger holds 62, 64, and the finger hold area A3 defined thereby.

As should be apparent from the foregoing, the device peripheral edge P2 of the exterior surface 68 defines a first section P2a having an edge profile that is complimentary to the opening peripheral edge P1 of the opening 20 and a second section P2b having an edge profile that is indented in relation to the first section P2a. In the illustrated embodiment, this first section P2a encompasses the portion of the device peripheral edge P2 other than the second section P2b, that defines the indentations defining the finger holds 62, 64. As such, the first section P2a defines a convex arcuate edge profile. As a result of the edge profile of the second section P2b being indented (i.e., concave) in relation to the edge profile of the first section P2a, when the noise attenuating device 50 is secured in the opening 20, at least one gap G is formed between the device peripheral edge P2 and the opening peripheral edge P1. The at least one gap G corresponds at least to the finger holds 62, 64, defined by the finger hold area A3.

In the foregoing discussion, the opening 20 is contemplated to be circular. While this is the most likely configuration for the opening 20, the present invention should not be understood to be limited solely to this construction. The opening 20 and the noise attenuating device 50 may have any shape without departing from the scope of the present invention.

As should be apparent to those skilled in the art, the exterior surface 68 is contemplated to have a shape that conforms to the surface of the skin 21 of the aircraft 10.

It is contemplated that the height of the exterior surface 68 of the noise attenuating device 50 relative to the skin 21 of the aircraft 10 may be varied. This height variation is contemplated to be modest, as should be apparent to those skilled in the art.

Figure 6:
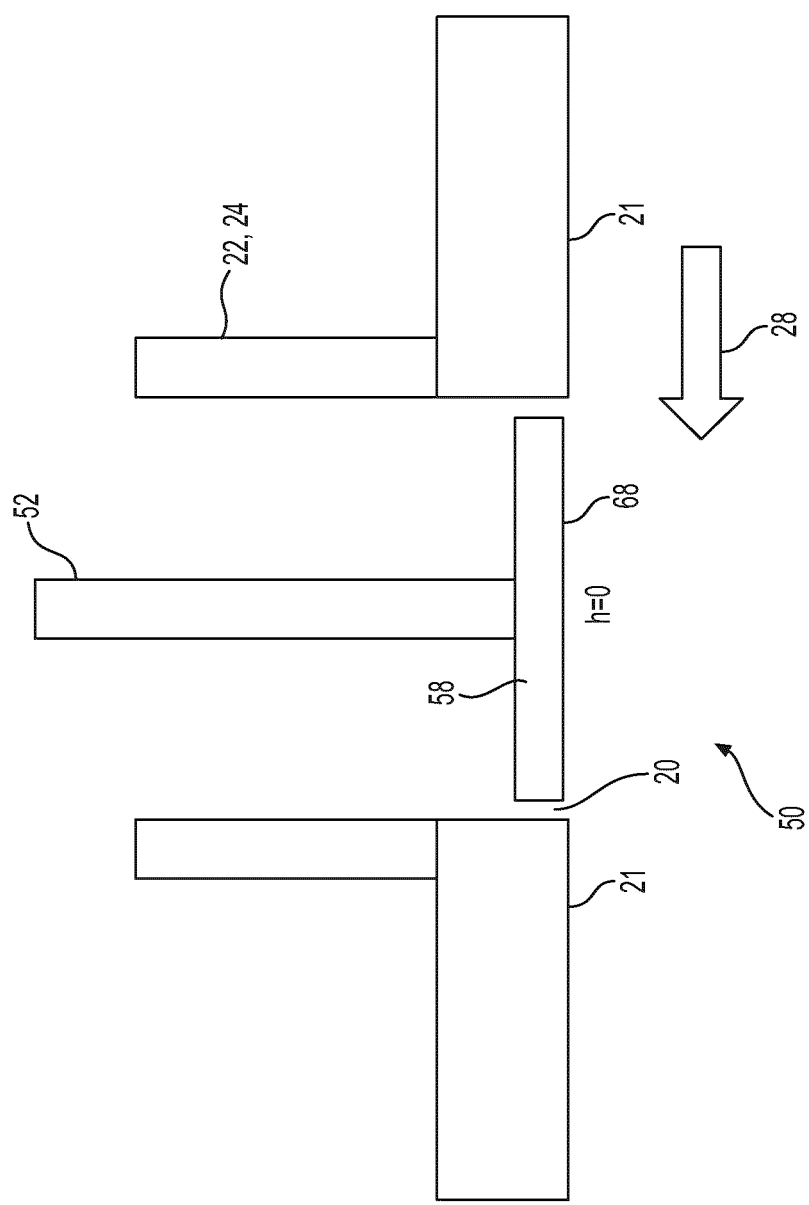
FIG. 6 is a graphical, side view illustration of the noise attenuating device illustrated in FIG. 4, showing a contemplated configuration where the exterior surface of the noise attenuating device is contiguous with the skin of the aircraft.

As illustrated in FIG. 6, the exterior surface 68 may be contiguous with the aircraft skin 21, such that h=0 as shown. However, in alternative embodiments, the exterior surface 68 may be offset from the skin 21 by a predetermined offset distance h. For example, the exterior surface 68 may be recessed from the skin 21 such that the exterior surface 68 is internal to the skin 21 and h<0, where "0" indicates zero offset from the skin 21. Alternatively, the exterior surface 68 may be positioned exterior to the skin 21 such that h>0.

As FIG. 6 highlights, the exact height h of the exterior surface 68 with respect to the aircraft skin 21 may be varied, as required or as desired. It is contemplated, however, that the typical implementation will position the exterior surface 68 and the aircraft skin 21 so that h=0 or nearly thereto.

Figure 7:
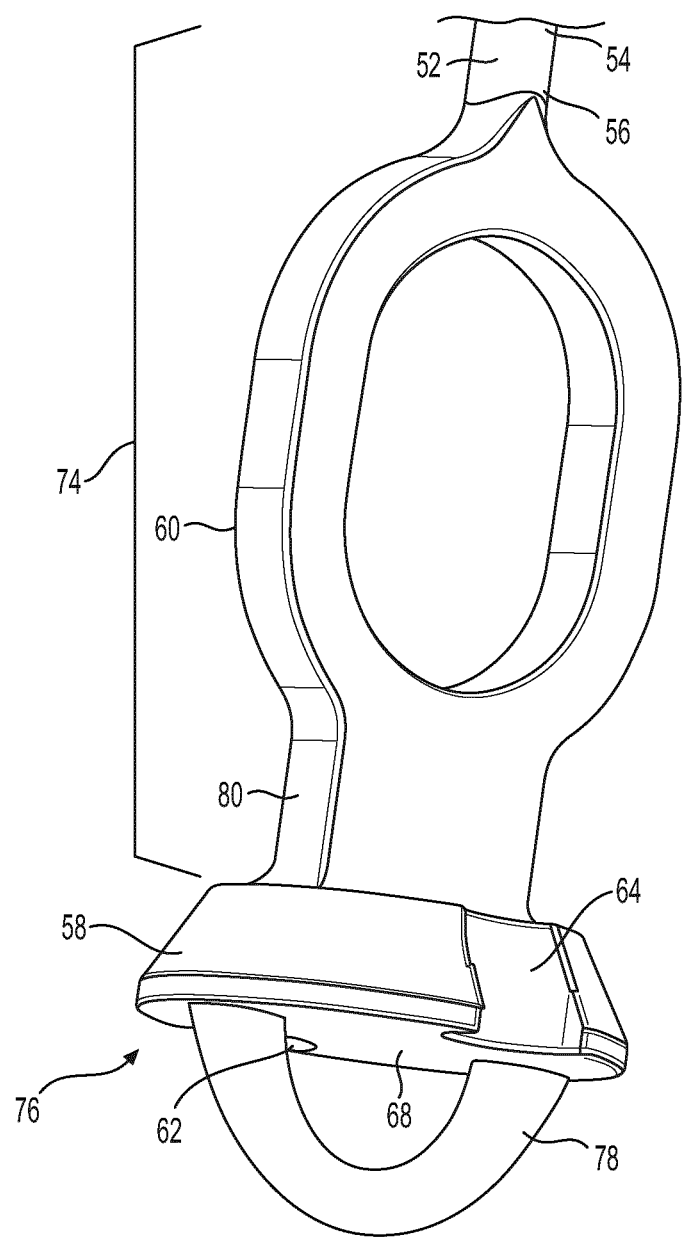
FIG. 7 is a perspective, graphical illustration of a second embodiment of a noise attenuating device of the present invention, where the noise attenuating device also includes a handle.
Figure 8:
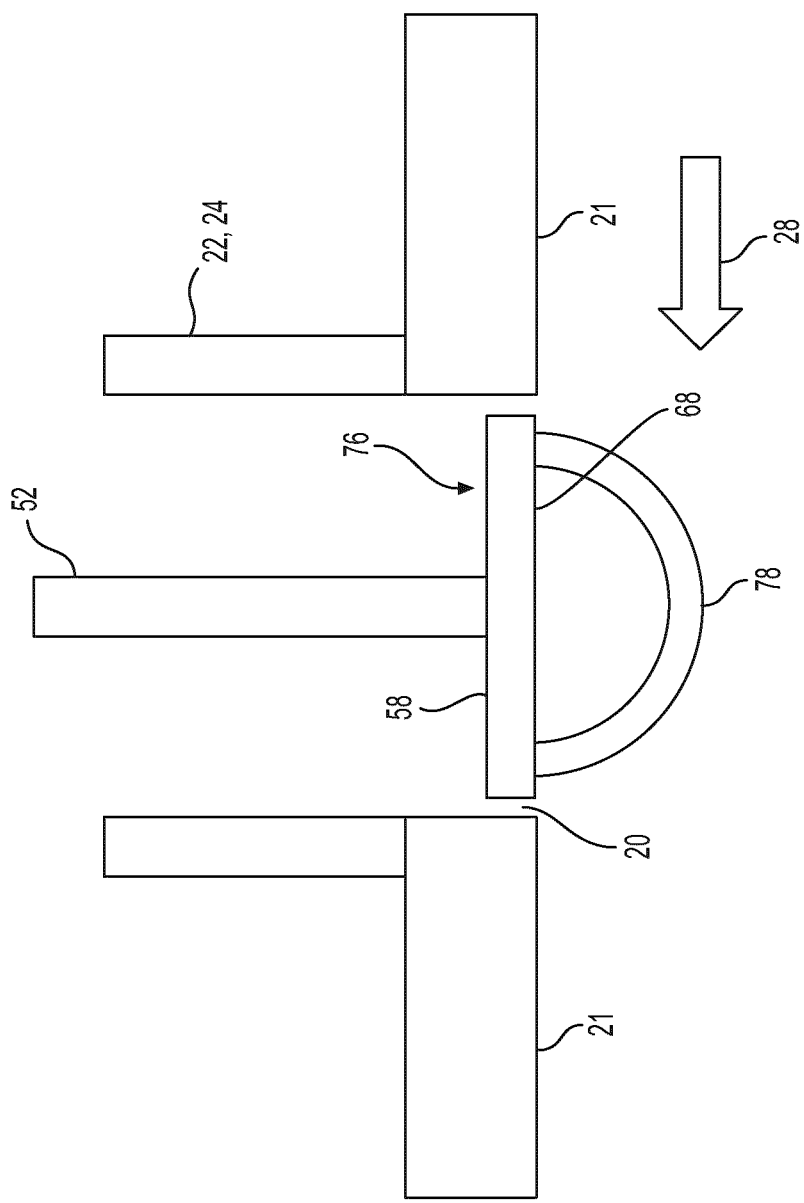
FIG. 8 is a graphical, side view illustration of the noise attenuating device illustrated in FIG. 7, showing a contemplated configuration where the exterior surface is contiguous with the skin of the aircraft with the handle extending outside the skin of the aircraft and being aligned with the direction of air flow.

FIG. 7 is a perspective illustration of a second embodiment of noise attenuating device 76 according to the present invention. This embodiment is a variation of the noise attenuating device 50. Here, a handle 78 has been added to the exterior surface 68. In addition, the connection mechanism 70 has been replaced by a connection mechanism 80 that is an integral extension of the handle 60. In this embodiment, the handle 78 is provided to add a separate graspable portion to enhance the operability of the noise attenuating device 76 by providing the noise attenuating device 76 with additional accessibility. In this embodiment, the noise attenuating device 76 forms part of the actuator 74. As with the connection mechanism 70, the connection mechanism 80 secures the noise attenuating device 76 in proximity to the opening 20.

Figure 9:
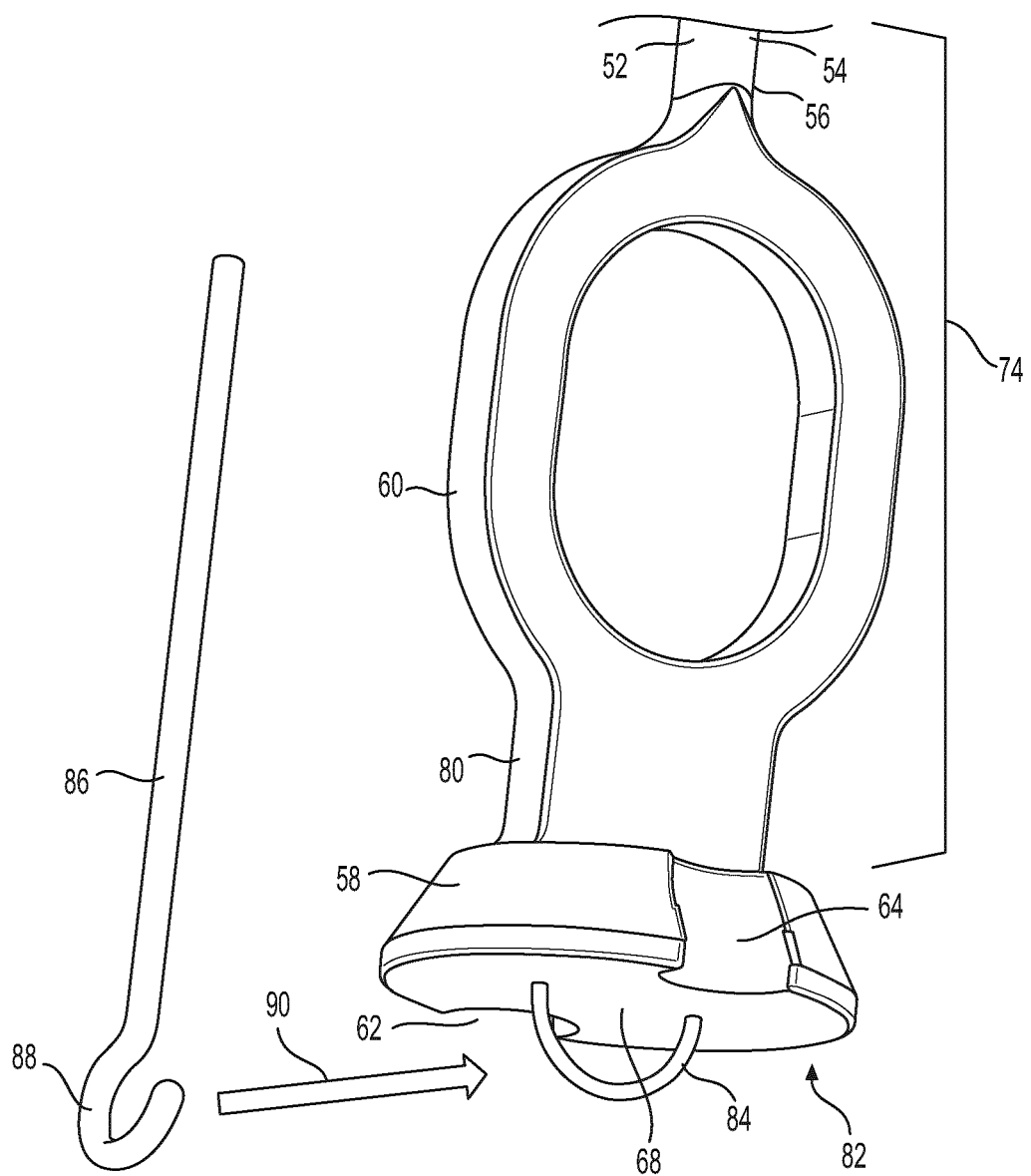
FIG. 9 is a perspective, graphical illustration of a third embodiment of a noise attenuating device of the present invention, where the noise attenuating device includes a handle that is graspable by a hook.

FIG. 9 is a perspective illustration of a third embodiment of a noise attenuating device 82 according to the present invention. The noise attenuating device 82 shares many of the same elements of the noise attenuating device 76. In this embodiment, a handle 84 is provided. The handle 84 has a smaller thickness and profile than the handle 78 provided on the noise attenuating device 76. This design is contemplated to cooperate with a grasping tool 86 having a hook 88 at one end. The hook 88 is contemplated to engage the handle 84 as indicated by the arrow 90.

Figure 10:
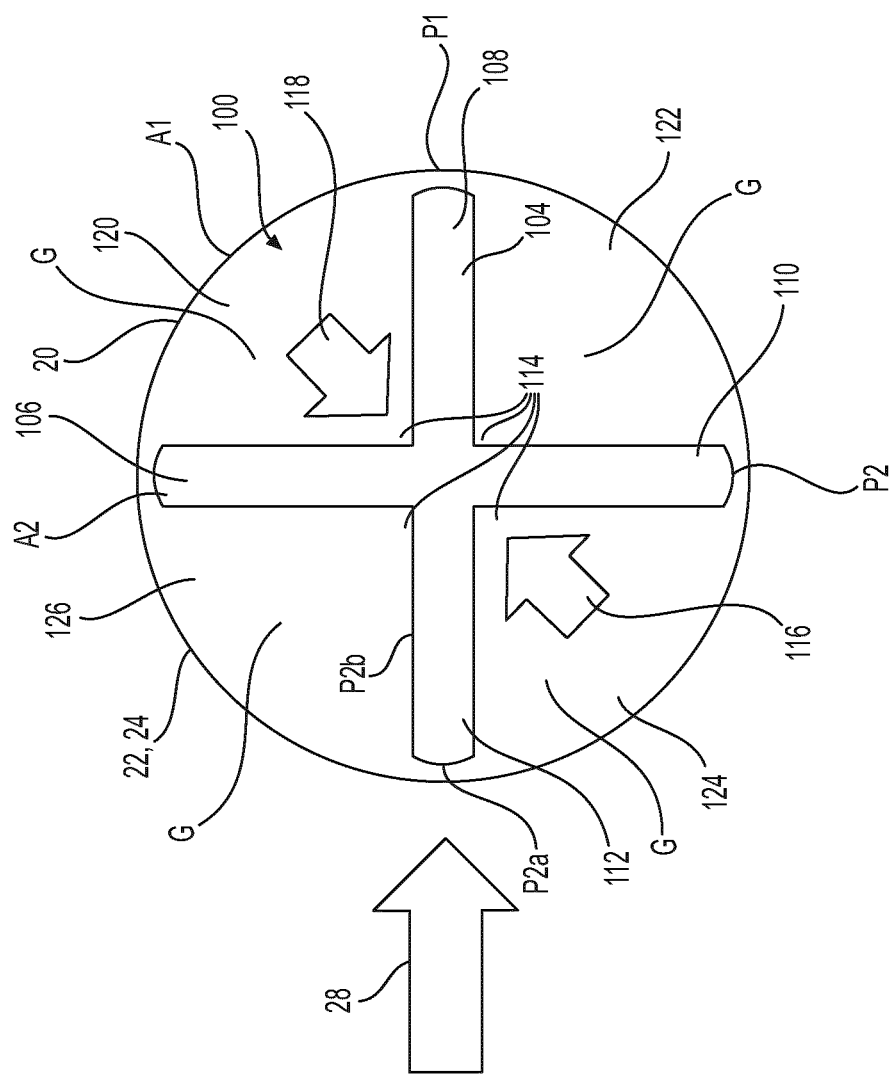
FIG. 10 is a bottom plan view of a fourth embodiment of a noise attenuating device of the present invention with a cross-shaped structure, the noise attenuating device being disposed in a first orientation.

FIG. 10 is a bottom plan view of a fourth embodiment of a noise attenuating device 100 according to the present invention. As in the prior embodiments, the noise attenuating device 100 connects to the fuel tank overpressure relief valve 26 to permit manual cycling of the fuel tank overpressure relief valve 26.

In this embodiment, the noise attenuating device 100 has a cross-shape. As discussed below, the cross-shape attenuates noise generated by the opening 20 and the conduit 22, 24.

Here, the noise attenuating device 100 includes four vanes 106, 108, 110, 112 that are arranged perpendicularly to one another in a cross-shaped formation. This cross-shaped noise attenuating device 100 can be attached to a stem 52 in any of the manners described above with respect to noise attenuating devices 50, 76, 82. Alternatively, the noise attenuating device 100 may define a cross-shape along the length of the conduit 22, 24 from the opening 20 to the fuel tank overpressure relief valve 26.

To open the fuel tank overpressure relief valve 26, a user grasps the noise attenuating device 100 at, for example, the graspable portions 114, by applying pressure in the direction of the arrows 116, 118. While applying pressure to two or more of the graspable portions 114 in the direction of the arrows 116, 118, the user may open the fuel tank overpressure relief valve 26 to cycle the valve.

Consistent with the other embodiments of the noise attenuating device 50, 76, 82, the noise attenuating device 100 cooperates with the opening 20. As shown in FIG. 10, the opening 20 defines a first surface area A1 and an opening peripheral edge P1. The noise attenuating device 100 comprises an exterior surface 104 defining a second surface area A2 that is less than the first surface area A1 defined by the opening 20. As should be apparent, the exterior surface 104 is contemplated to define a device peripheral edge P2. The device peripheral edge P2 comprises two features. First, the device peripheral edge P2 comprises a first section P2a with an edge profile that is complimentary to at least a portion of the opening peripheral edge P1. In the embodiment shown, the first section P2a is defined by the ends of the vanes 106, 108, 110, 112, which may have a convex edge profile or may have straight edge profiles. Either way, the first section P2a is in proximity to the opening peripheral edge P1 and is substantially complementary thereto. Second, the device peripheral edge P2 comprises a second section P2b with four indented edge profiles in relation to the first section P2a. In the embodiment shown in FIG. 10, the peripheral edge of the second section P2b comprises four V-shaped indents. When the noise attenuating device 100 is secured within the opening 20, four gaps G are formed between the device peripheral edge P2 and the opening peripheral edge P1. As before, the gaps G establish four finger-holds or graspable portions 114, that permit a user, such as a technician, to insert fingers into the gaps G to manipulate the noise attenuating device 100.

In the same manner as described above, the four gaps 120, 122, 124, 126 allow fuel to pass through the opening should the fuel tank overpressure relief valve 26 be actuated during a fuel tank overpressure condition. The gaps 120, 122, 124, 126 also function as finger holds.

The four vanes 106, 108, 110, 112 also help to reduce noise generated by airflow over the opening 20 by disturbing the air flow and breaking the consistency of airflow over the conduit 22, 24.

FIG. 10 illustrates one variant of the noise attenuating device 100. In this embodiment, the noise attenuating device 100 is disposed in the conduit 22, 24 such that two of the four vanes 108, 112 are parallel to the air flow 28. The other two of the four vanes 106, 110 are perpendicular to the air flow 28.

Figure 11:
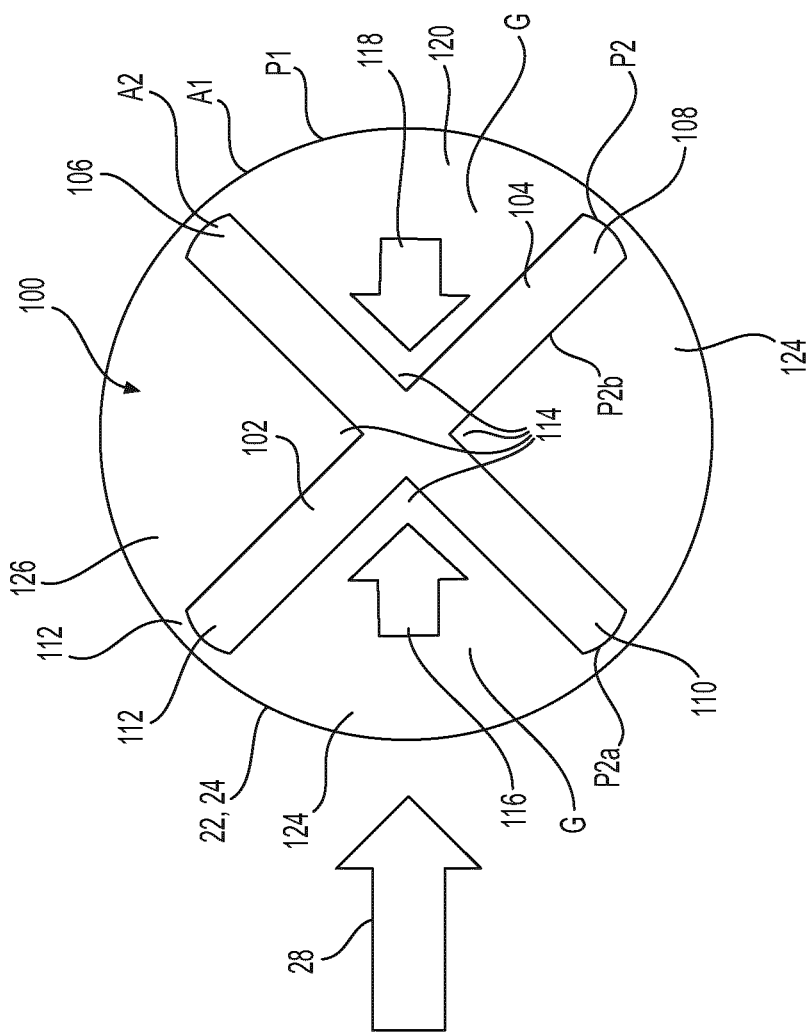
FIG. 11 is a top view of the fourth embodiment of the noise attenuating device of the present invention illustrated in FIG. 10, showing the noise attenuating device in a second orientation.

FIG. 11 illustrates a variant of the noise attenuating device 100, showing all of the vanes 106, 108, 110, 112 being disposed at a 45° angle with respect to the air flow 28. It is contemplated that this variant will provide a greater silencing effect as a result of better breaking of the consistency of air flow over the opening 20. However, any angular variation from the embodiment illustrated in FIG. 10 to the variant illustrated in FIG. 11 is contemplated to fall within the scope of the present invention.

With respect to the noise attenuating device 100, it is noted that the ends of the vanes 106, 108, 110, 112 establish the first section P2a of the exterior surface 104 that are substantially complimentary to at least a portion of the opening peripheral edge P1 of the opening 20. Since the exterior surface 104 defines a cross-shape, the first section P2a of the device peripheral edge P2 is defined by the end surfaces of each of the vanes 106, 108, 110, 112 of the cross-shaped noise attenuating device 100. As before, the second section P2b has an edge profile that is indented in relation to the first section P2a so that four gaps G are formed between the device peripheral edge P2 and the opening peripheral edge P1. Here the tops of the vanes 106, 108, 110, 112 establish the exterior surface 104.

As illustrated in FIGS. 10-11, the exterior surface 104 defines a second surface area A2 that is smaller than the first surface area A1 because of the inclusion of the finger holds 114 that define the finger hold area A3. Specifically, a ratio of the second surface area A2 to the first surface area A1 is contemplated to be less than or equal to 0.2. In another embodiment, the ratio may be less than or equal to 0.15. Still further, the ratio is contemplated to be less than or equal to 0.1. In yet another configuration, the ratio may be less than or equal to 0.05. As should be apparent, the magnitude of this ratio may depend on a number of variables including, but not limited to, the size of the second surface A2, the size of the first surface area A1, and the sizes of the finger holds 114 and the finger hold area A3 defined thereby.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A noise attenuating device for reducing excitation of acoustic resonance in a cavity of an aircraft, the cavity having an opening in a skin of the aircraft, the opening defining a first surface area and an opening peripheral edge, the noise attenuating device comprising:
   a connection mechanism for securing the noise attenuating device in proximity to the opening in the skin of the aircraft; and
an exterior surface that defines:
   a second surface area that is less than the first surface area of the opening; and
   a device peripheral edge comprising:
      i) a first section having an edge profile complimentary to at least a portion of the opening peripheral edge; and
      ii) a second section having an indented edge profile in relation to the first section such that when the noise attenuating device is secured within the opening, at least one gap is formed between the device peripheral edge and the opening peripheral edge;
   wherein the exterior surface defines a cross-shape, the first section of the device peripheral edge being end surfaces of each arm of the cross-shape, the cross-shape being formed by four vanes that are arranged perpendicularly to one another in a cross-shaped formation.

2. The noise attenuating device of claim 1, wherein the first section has a convex arcuate edge profile.

3. The noise attenuating device of claim 1, wherein the second section has a concave arcuate edge profile.

4. The noise attenuating device of claim 1, wherein the indented edge profile defines a finger-hold for grasping the exterior surface.

5. The noise attenuating device of claim 4, wherein the indented edge profile defines two finger-holds for grasping the exterior surface.

6. The noise attenuating device of claim 1, further comprising a handle extending from the exterior surface.

7. The noise attenuating device of claim 1, wherein the exterior surface conforms to a shape of the skin of the aircraft.

8. The noise attenuating device of claim 1, wherein two of the four vanes of the cross-shape are aligned with an air flow across the opening.

9. The noise attenuating device of claim 1, wherein two of the four vanes of the cross-shape are disposed at substantially 45° with an air flow across the opening.

10. The noise attenuating device of claim 1, wherein the cavity leads to a fuel overpressure relief valve and a stem extends between the fuel overpressure relief valve and the opening, wherein the connection mechanism connects the noise attenuating device to the stem.

11. The noise attenuating device of claim 10, wherein the connection mechanism comprises one of a threaded shaft and a threaded hole.

12. The noise attenuating device of claim 10, wherein the connection mechanism comprises an integrally formed connection between the stem and the noise attenuating device.

13. The noise attenuating device of claim 1, wherein a ratio of the second surface area to the first surface area is greater than or equal to 0.8.

14. The noise attenuating device of claim 13, wherein the ratio is greater than or equal to 0.85.

15. The noise attenuating device of claim 14, wherein the ratio is greater than or equal to 0.90.

16. The noise attenuating device of claim 15, wherein the ratio is greater than or equal to 0.95.

17. The noise attenuating device of claim 1, wherein a ratio of the second surface area to the first surface area is less than or equal to 0.2.

18. The noise attenuating device of claim 17, wherein the ratio is less than or equal to 0.15.

19. The noise attenuating device of claim 18, wherein the ratio is less than or equal to 0.1.

20. The noise attenuating device of claim 19, wherein the ratio is greater than or equal to 0.05.

21. The noise attenuating device of claim 1, wherein the skin of the aircraft is a wing skin, and wherein the connection mechanism secures the exterior surface of the noise attenuating device a predetermined offset distance h from the wing skin.

22. The noise attenuating device of claim 21, wherein the exterior surface is contiguous with the wing surface such that h=0.

23. The noise attenuating device of claim 21, wherein the exterior surface is interior to the wing surface such that h<0.

24. The noise attenuating device of claim 21, wherein the exterior surface is exterior to the wing surface such that h>0.

* * * * *